United States Patent
Nakajima et al.

(10) Patent No.: US 7,607,983 B2
(45) Date of Patent: Oct. 27, 2009

(54) GAME PROGRAM AND GAME DEVICE USING TOUCH PANEL

(75) Inventors: Souichi Nakajima, Kyoto (JP); Kiyoshi Mizuki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 595 days.

(21) Appl. No.: 11/265,431

(22) Filed: Nov. 3, 2005

(65) Prior Publication Data

US 2006/0189385 A1    Aug. 24, 2006

(30) Foreign Application Priority Data

Feb. 23, 2005   (JP)   .............................. 2005-047173

(51) Int. Cl.
   *G05D 7/00* (2006.01)
(52) U.S. Cl. ...................................... 463/40
(58) Field of Classification Search ............. 463/40–44; 446/175
   See application file for complete search history.

(56) References Cited

U.S. PATENT DOCUMENTS 6,966,837 B1 *   11/2005   Best .............................. 463/33
7,331,868 B2 *   2/2008   Beaulieu et al. ................ 463/30
2004/0032395 A1 *   2/2004   Goldenberg et al. ......... 345/156
2004/0166930 A1 *   8/2004   Beaulieu et al. ................ 463/25

FOREIGN PATENT DOCUMENTS

GB        2 346 455        8/2000
JP        2001-062145      3/2001
JP        2002-000939      1/2002

* cited by examiner

*Primary Examiner*—Peter DungBa Vo
*Assistant Examiner*—Masud Ahmed
(74) *Attorney, Agent, or Firm*—Nixon & Vanderhye P.C.

(57) ABSTRACT

Reading from a RAM, image data of a rotating object, and displaying the rotating object on the display screen; obtaining touch position coordinates on the touch panel; when a contact to the touch panel is performed, calculating at each interval of a given period, an angle variation amount between coordinates displaying a rotation axis of the rotating object and the touch position coordinates; periodically adding to an operation parameter stored in the RAM, a value resulting from a multiplication of a coefficient with the angle variation amount, wherein the coefficient changes in accordance with a size of the parameter; and changing a display angle of the rotating object on the display screen in accordance with a change in the operation parameter. Therefore, there is realized an input operation for controlling a movement of an object by using a touch panel, wherein the input operation has good operability without being monotonous.

8 Claims, 10 Drawing Sheets

| PROGRAM STORAGE AREA | |
|---|---|
| GAME PROGRAM | 41 |
| DATA STORAGE AREA | |
| DATA ON ROTATING OBJECT (POSITION DATA, IMAGE DATA) | 42 |
| DATA ON OTHER OBJECTS (POSITION DATA, IMAGE DATA) | 43 |
| TOUCH POSITION COORDINATES | 44 |
| ROTATION AXIS DISPLAY COORDINATES | 45 |
| CURRENT RELATIVE ANGLE | 46 |
| IMMEDIATELY PRECEDING RELATIVE ANGLE | 47 |
| ANGLE VARIATION AMOUNT | 48 |
| COEFFICIENT TABLE | 49 |
| OPERATION PARAMETER | 50 |
| ROTATING OBJECT DISPLAY ANGLE | 51 |

FIG. 4

| OPERATION PARAMETER | COEFFICIENT |
|---|---|
| 0 ~ 2160 | 1.0 |
| 2161 ~ 3240 | 0.5 |
| 3241 ~ 3600 | 0.2 |

| OPERATION PARAMETER | SPEED |
|---|---|
| 3600 ~ 1440 | 30 |
| 1439 ~ 360 | 20 |
| 359 ~ 0 | 10 |

GAME PROGRAM AND GAME DEVICE USING TOUCH PANEL

BACKGROUND

1. Field of the Technology

The technology presented herein relates to a game program and a game device using a touch panel, and more particularly to a game program and a game device for detecting an input operation such as drawing a circle on the touch panel performed by a player, and using a detected result for a game process.

2. Description of the Background Art

By the use of a touch panel as an input device, on touching an image of a button displayed on a display screen provided under a touch panel for example, it is possible to easily input a command corresponding to the button. An application of such touch panel as an input device of a video game system is also considered. For example, in Japanese Laid-Open Patent Publication No. 2002-939 (hereinafter referred to as "patent document 1") is disclosed a game which allows the player to enjoy the game by touching an object displayed on a screen, and also sliding the object with his/her finger kept on the object, thus making the player feel as if he/she is actually moving the object with his/her finger.

On the other hand, in the Japanese Laid-Open Patent Publication No. 2001-62145 (hereinafter referred to as "patent document 2") is disclosed a technique for storing as an energy of an object, an amount of operation of a pointing device such as a mouse, and controlling a movement of the object in accordance with a stored energy value. To give a concrete example, when the player is continuously moving the mouse back and forth, the energy value increases in accordance with an amount of movement, and then the object is moved in a speed in accordance with an amount of energy value, or moved for a distance in accordance with the amount of energy value.

However, the technique disclosed in the patent document 1 merely moves the object to a position where the player touched, thus causing a movement operation to be monotonous, and having a problem of reducing an enjoyment of the game.

In the technique disclosed in the patent document 2, since a movement of an object is controlled by using a stored energy value in accordance with an amount of operation of a pointing device, a movement operation is avoided to be monotonous as is in the patent document 1, and an enjoyment of the game is increased. However, there is a problem that while the energy is stored, the player is not able to know how much energy is stored. Taking an example of a case when playing with a real wind-up toy car instead of a video game, the player is able to perceive how much energy is stored in the spring by feeling a strength of resistance by hand. However, since the player cannot feel such resistance in the game disclosed in the patent document 2, the player is not able to perceive how much energy is stored. Thus, the player is required to perform an input operation for controlling the movement of the object depending entirely on his/her intuition. Though this may work to increase the enjoyment of the game in certain types of games, for other games, it may cause the player may feel that the operability is not good. This is also same in a case where a mouse is used in place of a touch panel.

SUMMARY

Therefore, a feature of an example embodiment presented herein is to provide an input operation for controlling a movement of an object by using a touch panel, wherein the input operation has good operability without being monotonous.

To attain the above, the example embodiment has adopted the following features. Note that the reference numerals within parentheses, which are provided only for showing correspondences to drawings to facilitate the understanding of the example embodiment, do not restrict the scope in any manner.

A first aspect of the example embodiment is directed to a computer readable storage medium having stored therein a game program (41) causing a computer (21) of a game device (10) to execute the following steps (A) to (F), wherein the game device comprises a display screen (12) for displaying a game screen, a touch panel (15) provided on the display screen, and a storage area (24).

(A) A step for reading from the storage area, image data of a rotating object having a predetermined rotation axis, and displaying the rotating object on the display screen (S10).

(B) A step for obtaining touch position coordinates on the touch panel (S14).

(C) A step for, when a contact on the touch panel is performed, calculating at each interval of a given period, an angle variation amount between coordinates displaying a rotation axis of the above rotating object and the touch position coordinates (S18).

(D) A step for periodically adding to a predetermined parameter stored in the storage area for a game process, a value resulting from a multiplication of a coefficient with the angle variation amount, wherein the coefficient changes in accordance with a size of the parameter (S22).

(E) A step for changing a display angle of the rotating object on the display screen in accordance with the change in the parameter (S24).

(F) A step for using the parameter for the game process after a contact to the touch panel is released (S36).

Figure 4:
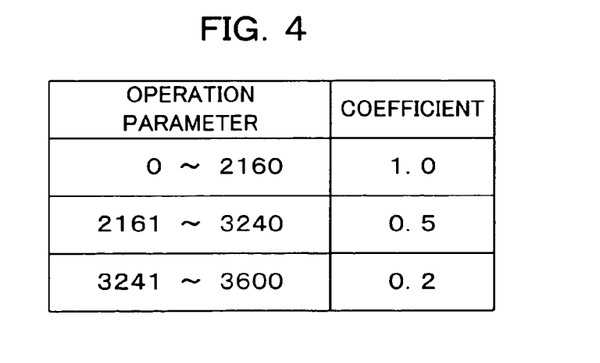
FIG. 4 is an example of a coefficient table 49.

A second aspect of the example embodiment is characterized in that, the coefficient reduces as the parameter increases (FIG. 4). A value of the coefficient may be determined by a calculation using a function which takes the parameter as an argument, or may be determined by referring to a table defining a correspondence of the parameter to the argument.

A third aspect of the example embodiment is characterized in that an adding process of the above adding step (D) is performed only when the angle variation amount is either positive or negative.

A fourth aspect of the example embodiment is characterized in that, when the parameter has reached a predetermined maximum value, the game program further causes the computer to execute step (S32) for providing a special display effect on the rotating object. Followings are examples of the special display effect: vibrating the rotating object (FIG. 8D); changing a color of the rotating object; changing a size of the rotating object; and changing a shape of the rotating object.

A fifth aspect of the example embodiment is characterized in that, the parameter using step (F) moves, in the game space, the virtual object having the rotating object with a speed in accordance with the parameter (S40, S42), and reduces the parameter in accordance with a movement amount of the virtual object (S44). Objects such as a wind-up robot or a music box may be considered as examples of a virtual object.

A sixth aspect of the example embodiment is characterized in that, the parameter using step (F) operates, in the game space, the virtual object having a rotating object, for a time period in accordance with the parameter.

A seventh aspect of the example embodiment is directed to a game device comprising a display screen (12) for displaying a game screen, a touch panel (15) provided on the display screen, a storage area (24), and a processing section (21). The processing section has the following functions; reading from the storage area, image data of a rotating object having a predetermined rotation axis, and displaying the rotating object on the display screen; obtaining touch position coordinates on the touch panel; when a contact on the touch panel is performed, calculating at each interval of a given period, an angle variation amount between coordinates displaying the rotation axis of the rotating object and the touch position coordinates; periodically adding to a predetermined parameter stored in the storage area for a game process, a value resulting from a multiplication of a coefficient with the angle variation amount, wherein the coefficient changes in accordance with a size of the parameter; changing a display angle of the rotating object on the display screen in accordance with a change in the parameter; and using the parameter for the game process after the contact to the touch panel is released.

An eighth aspect of the example embodiment is characterized in that, the coefficient reduces as the parameter increases.

A ninth aspect of the example embodiment is characterized in that the processing section performs an adding process on the parameter only when the angle variation amount is either positive or negative.

A tenth aspect of the example embodiment is characterized in that the processing section provides a special display effect on the rotating object when the parameter has reached a predetermined maximum value.

According to the example embodiment, a parameter is changed by an operation of a touch panel to draw a circle around a rotation axis of a rotating object with a finger or a pen, and since the parameter is used for a game process after the finger or the pen is removed from the touch panel, an enjoyable input operation without being excessively monotonous is realized. Furthermore, when a ratio of an increment of a parameter corresponding to an angle variation amount changes while a circle is continuously drawn, a ratio of an angle variation amount of the rotating object corresponding to the angle variation amount changes accordingly, thus the player is able to presume a size of the parameter from a movement of the rotating object, and an operability of the input operation is improved.

Specifically, according to the second aspect, as the number of rotations of the rotating object increases, it becomes difficult to rotate the object (i.e., an amount of rotation of the rotating object reduces relative to an amount of movement of the finger or pen), making the player feel as if he/she is actually winding a spring (i.e., a spring can be winded with a weak force at the beginning, but becomes to require a stronger force while continuing the winding motion), thus allowing the player to perform the input operation in an intuitional and natural manner.

According to the third aspect, resembling a general spring which is often made not to be intentionally rotated to a direction of loosening the spring, it is possible to provide a sense to the player as if the player is operating a spring which cannot be intentionally loosened.

According to the fourth aspect, when the parameter reaches a maximum value and it becomes no longer possible to increase the parameter, not only a rotation of the rotating object stops, but a special display effect is provided to the rotating objects to inform the player of such condition. If the rotation of the rotating object is merely stopped, the player may have concerns such as, if he/she is not touching the right position, or if it is a malfunction of the touch panel. This is solved by providing the special display effect, informing the player that the rotation of the rotating object is stopped for an appropriate reason that the parameter has reached the maximum value, thus allows the player to continue the game without having such concerns.

According to the fifth and sixth embodiments, by the use of the parameter, it is possible to control a movement of the virtual object imitating a movement of a wind-up object.

These and other features, aspects and advantages of the example embodiment presented herein will become more apparent from the following detailed description of the example embodiment when taken in conjunction with the accompanying drawings.

DESCRIPTION OF THE PREFERRED EMBODIMENTS

A configuration and a movement of a game device according to an embodiment will be described below.

Figure 1:
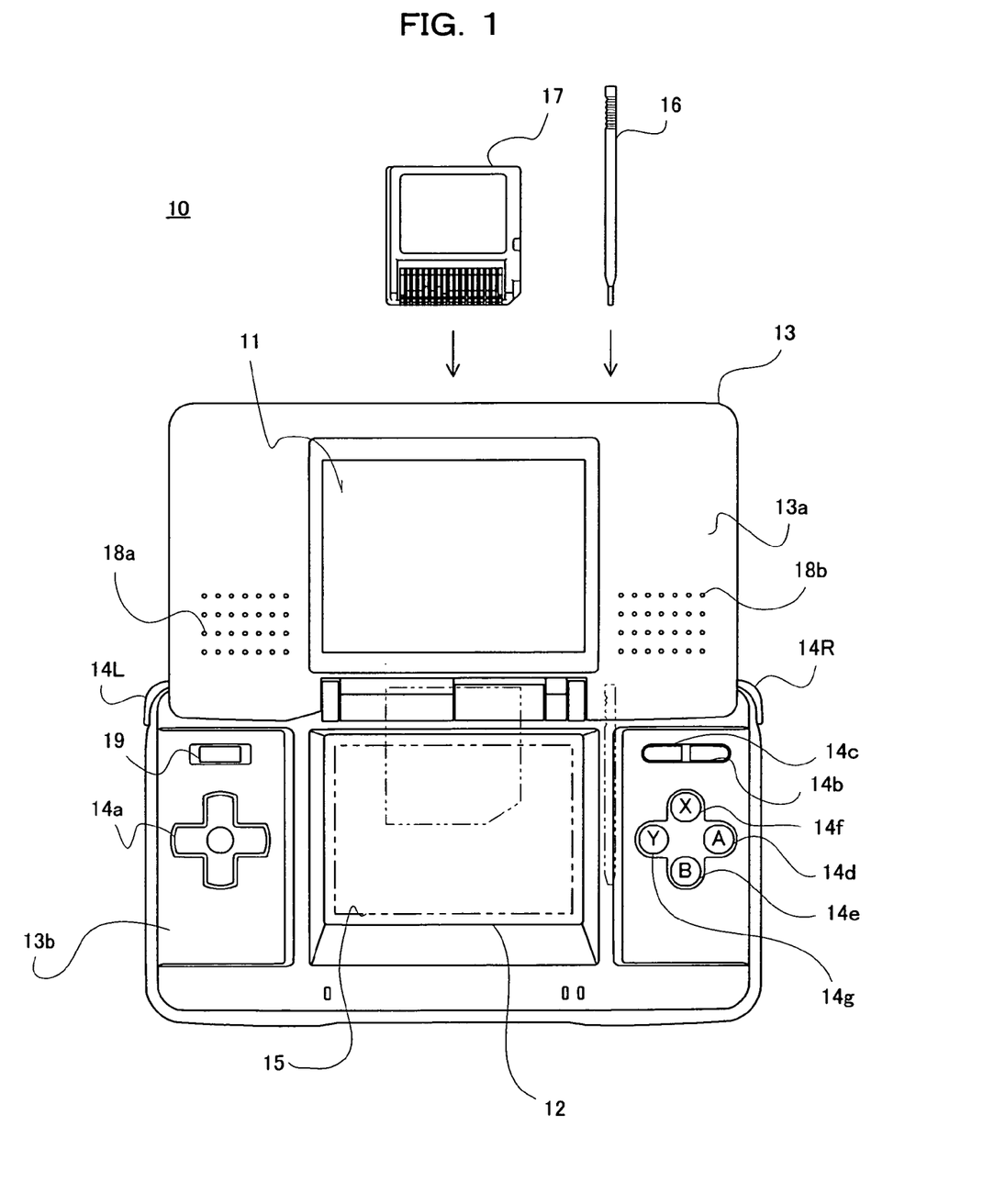
FIG. 1 is an external view of a game device according to an embodiment.

FIG. 1 is an external view of a game device according to an embodiment. In FIG. 1, a game device 10 includes a first LCD (Liquid Crystal Display) 11 and a second LCD 12. A housing 13 comprises an upper housing 13a and a lower housing 13b, and the first LCD 11 is stored in the upper housing 13a, and the second LCD 12 is stored in the lower housing 13b. Resolutions of the first LCD 11 and the second LCD 12 are both 256 dots×192 dots. Note that though a LCD is used as a display device in the present embodiment, any other display devices such as a display device using an EL (Electro Luminescence) may be used. Also, the resolution of the display device may be at any level.

The upper housing 13a is provided with sound holes 18a and 18b for releasing a sound from a pair of loudspeakers (30a and 30b shown in FIG. 2) to an exterior. A description of the pair of loudspeakers will be provided later.

The lower housing 13b is provided with input devices as follows; a cross switch 14a, a start switch 14b, a select switch 14c, a "A" button 14d, a "B" button 14e, a "X" button 14f, a "Y" button 14g, a "L" button 14L, and a "R" button 14R. In addition, a touch panel 15 is provided on a screen of the second LCD 12 as another input device. The lower housing 13b further includes a power switch 19, and insertion openings for storing a memory card 17 and a stick 16.

The touch panel 15 may be of any type such as a resistive film type, an optical type (infrared type), or a capacitive coupling type. The touch panel 15 has a function of outputting, when its surface is touched with the stick 16, coordinates data which corresponds to a touch position. Though the following description is provided on an assumption that the player uses a stick 16 to operate the touch panel 15, of course the touch panel 15 may also be operated by a pen (stylus pen) or a finger instead of the stick 16. In the present embodiment, a touch panel 15 having a resolution at 256 dots×192 dots (detection accuracy) as same as the second LCD 12 is used. However, resolutions of the touch panel 15 and the second LCD 12 may not necessarily be consistent with each other.

The memory card 17 is a storage medium having a game program stored therein, and placed in the insertion slot provided at the lower housing 13b in a removable manner.

Next, an internal configuration of the game device 10 will be described by referring to FIG. 2.

Figure 2:
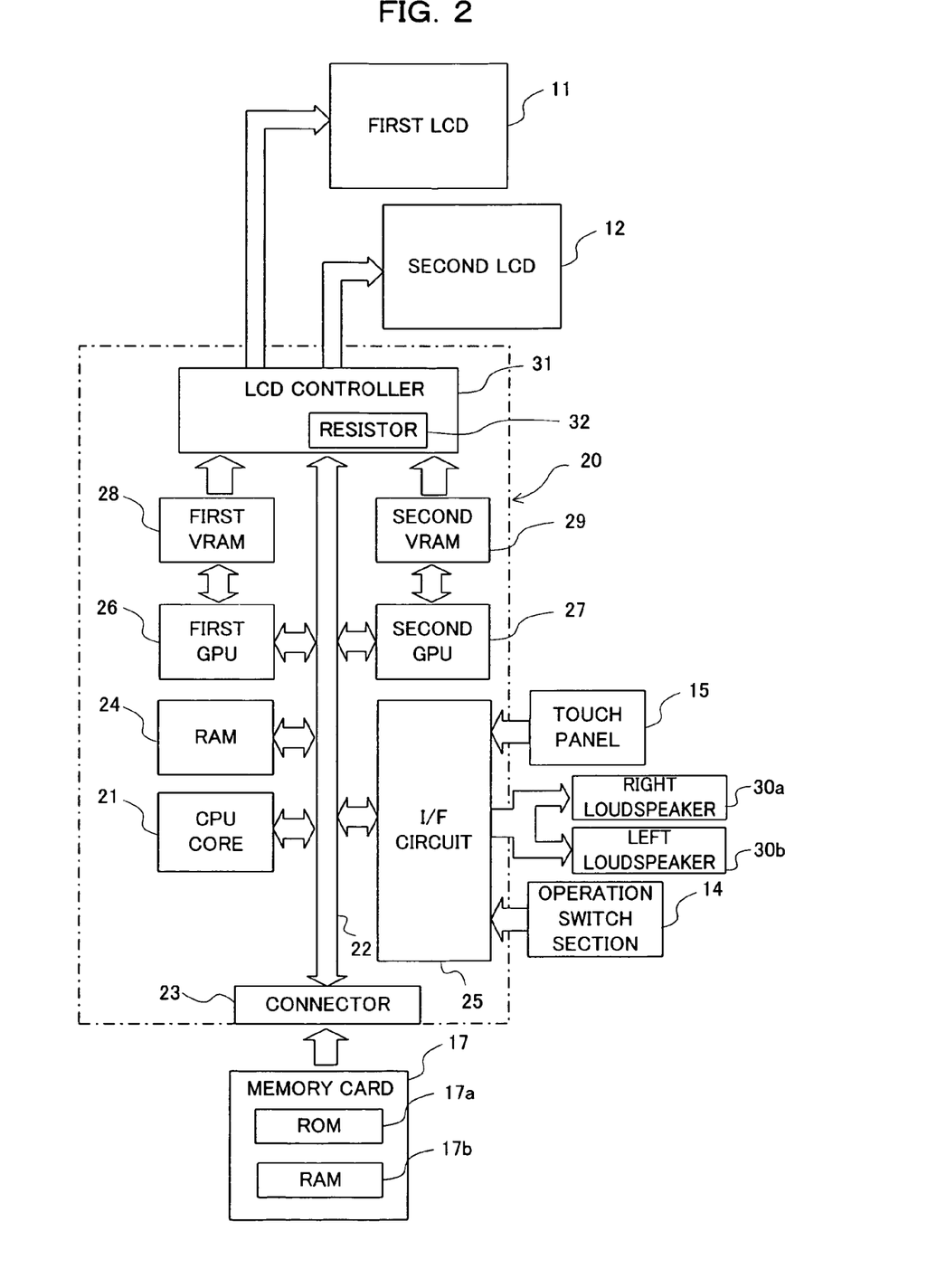
FIG. 2 is a diagram illustrating an internal configuration of a game device.

In FIG. 2, a CPU core 21 is mounted on an electronic circuit board 20 which is to be housed in the housing 13. Via a bus 22, the CPU core 21 is connected to a connector 23, an input/output interface circuit (shown as I/F circuit in the diagram) 25, a first GPU (Graphics Processing Unit) 26, a second GPU 27, a RAM 24, and a LCD controller 31. The memory card 17 is connected to the connector 23 in a removable manner. The memory card 17 includes a ROM 17a for storing a game program and a RAM 17b for storing backup data in a rewritable manner. The game program stored in the ROM 17a of the memory card 17 is loaded to the RAM 24, and the game program having been loaded to the RAM 24 is executed by the CPU core 21. The RAM 24 stores, in addition to the game program, data such as temporary data which is obtained by the CPU core 21 executing the game program, and data for generating a game image. To the I/F circuit 25 are connected, a touch panel 15, a right loudspeaker 30a, a left loudspeaker 30b and an operation switch section 14, which is comprised of a cross switch 14a, a "A" button 14d, and others, as shown in FIG. 1. The right loudspeaker 30a and the left loudspeaker 30b are arranged inside the sound holes 18a and 18b, respectively.

A first VRAM (Video RAM) 28 is connected to the first GPU 26, and a second VRAM 29 is connected to the second GPU 27. In accordance with an instruction from the CPU core 21, the first GPU 26 generates a first game image based on data used for image generation which is stored in the RAM 24, and writes images into the first VRAM 28. The second GPU 27 also follows an instruction from the CPU core 21 to generate a second game image, and writes images into the second VRAM 29. The first VRAM 28 and the second VRAM 29 are connected to the LCD controller 31.

The LCD controller 31 includes a resistor 32. The resistor 32 stores a value of either 0 or 1 in accordance with an instruction from the CPU core 21. When the value of the resistor 32 is 0, the LCD controller 31 outputs to the first LCD 11 the first game image which has been written into the first VRAM 28, and outputs to the second LCD 12 the second game image which has been written into the second VRAM 29. When the value of the resistor 32 is 1, the first game image which has been written into the first VRAM 28 is outputted to the LCD 12, and the second game image which has been written into the second VRAM 29 is outputted to the first LCD 11.

Note that the above configuration of the game device 10 is illustrative only. The example embodiment presented herein may be applied to any computer system including at least one display device having a touch panel provided on a screen. In addition, the game program of the example embodiment presented herein which is provided to a computer system through an external storage medium such as the memory card 17, may also be provided through a wired or a wireless communication line, or may be stored in advance in a nonvolatile storage device provided in the computer system.

Figure 3:
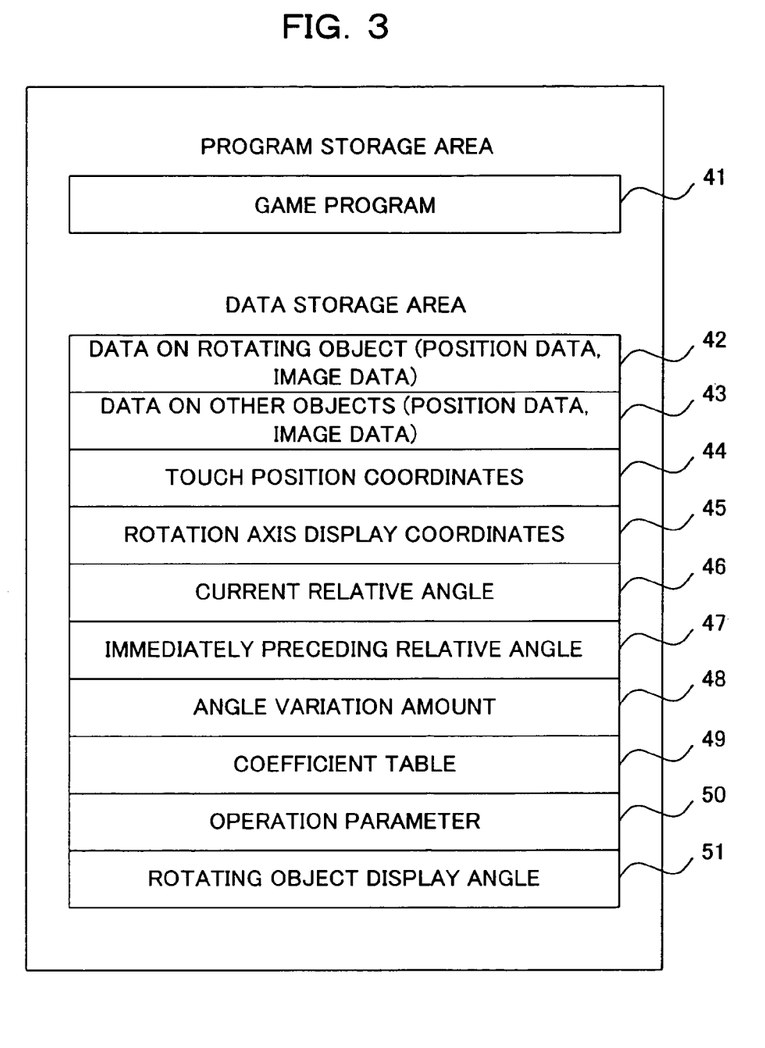
FIG. 3 is a memory map of a RAM 24.

A memory map of the RAM 24 is shown in FIG. 3. A storage area of the RAM 24 is mainly divided into a program storage area and a data storage area. In the program storage area there is loaded a game program 41, which is stored in the ROM 17a of the memory card 17. Various types of data as shown in FIG. 3 are stored in the data storage area.

Data 42 on the rotating object is data including position data and image data of the rotating object which will be described later. Data 43 on other objects is data including position data and image data of objects except the rotating object. The image data of the rotating object and other objects is read in from the ROM 17a of the memory card 17. The position data of the rotating object and other objects is set and updated as appropriate based on the game program 41.

Touch position coordinates 44 are coordinates indicating a touch position of a finger or the stick 16 on the touch panel 15, and is updated when necessary according to an output signal from the touch panel 15.

Rotation axis display coordinates 45 are coordinates displaying a rotation axis of the rotating object. A current relative angle 46 is an angle indicating a direction of the touch position coordinates 44 with respect to the rotation axis display coordinates 45, and is calculated and updated periodically (e.g., at each frame period) based on the rotation axis display coordinates 45 and the touch position coordinates 44. When updating the current relative angle 46, a value before being updated is temporally stored in the RAM 24 as an immediately preceding relative angle 47. An angle variation amount 48 is a value gained by subtracting the immediately preceding relative angle 47 from the current relative angle 46.

A coefficient table 49 is a table for determining a coefficient to be used when updating an operation parameter 50. The details of the coefficient table 49 will be provided later. The operation parameter 50 is a variable to be used when operating an object in a game space. A display angle 51 of the rotating object indicates an angle of the rotating object when the rotating object is displayed on the display screen of the first LCD 11 or the second LCD 12. The angle is determined in accordance with the operation parameter 50.

A concrete example of the coefficient table 49 is shown in FIG. 4. Here, the operation parameter 50 is assumed to be a value ranging from 0 to 3600. In the example shown in FIG. 4, when an operation parameter is within a range of 0 to 2160, a coefficient is determined to be 1.0, when the operation parameter is within a range of 2161 to 3240, the coefficient is determined to be 0.5, and when the operation parameter is within a range of 3241 to 3600, the coefficient is determined to be 0.2.

Next, an operation of the game device 10 (specifically, the CPU core 21) based on the game program 41 will be described by referring to a flowchart shown in FIG. 5.

Figure 5:
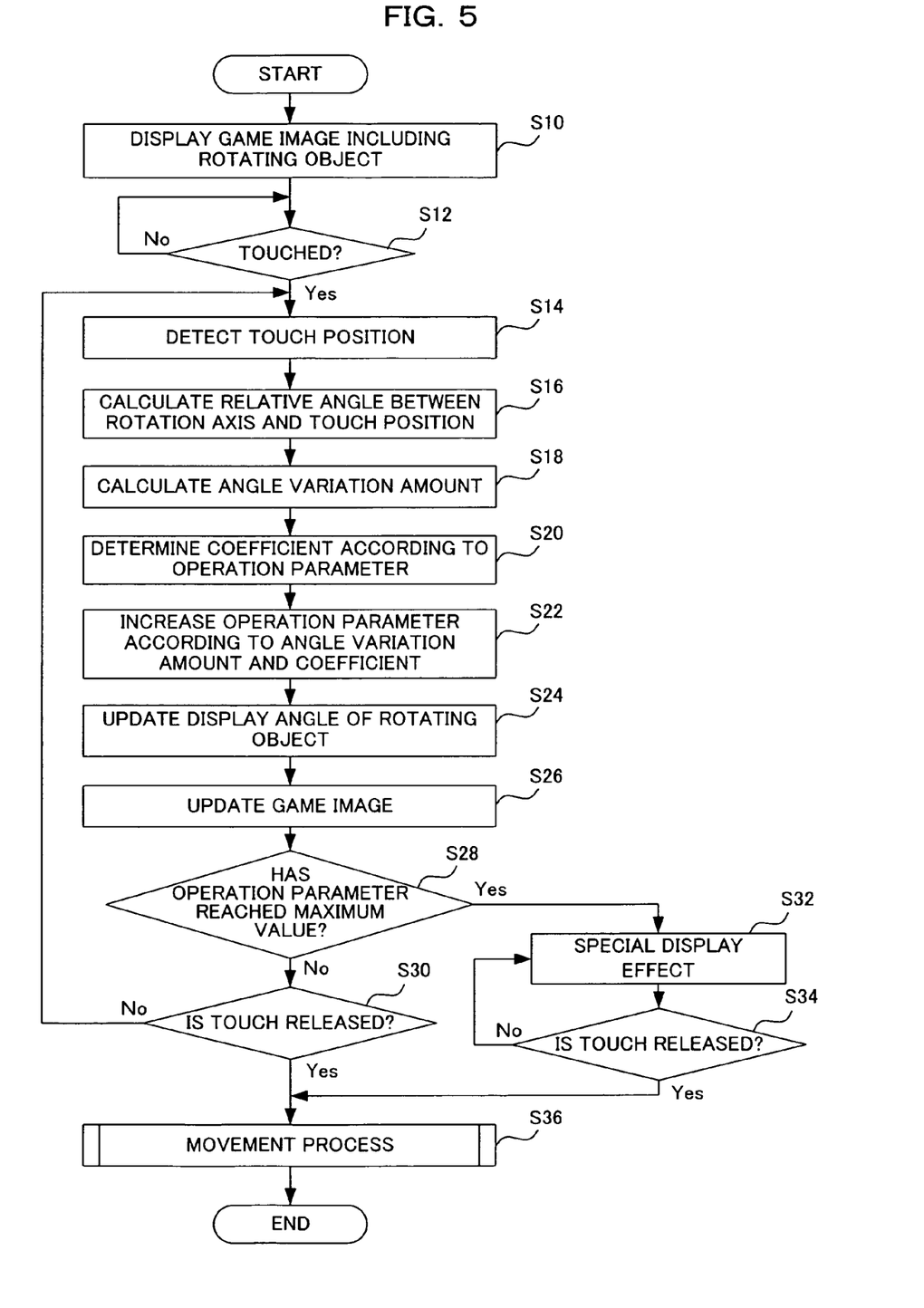
FIG. 5 is a flowchart illustrating an operation of a game device.
Figure 6:
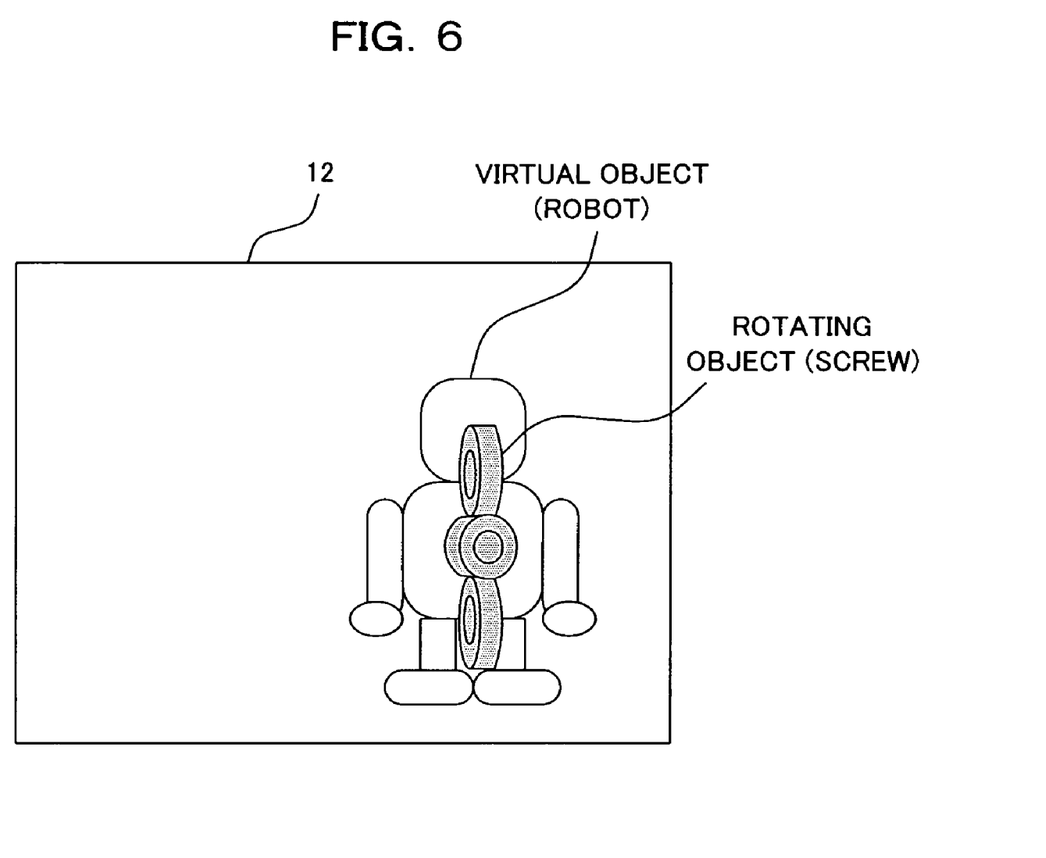
FIG. 6 is an example of a game screen before performing a rotating operation.

In FIG. 5, when the game program 41 is executed, then at step S10, the CPU core 21 displays the game image including the rotating object on the display screen of the second LCD 12 based on the data 42 on the rotating object and the data 43 on other objects. In an actual game, generally a process such as showing a title image or performing an initial setting is performed before staffing the game, however, since such process is not particularly important in the example embodiment, a step for such process is omitted from FIG. 5. An example of a game screen to be displayed at step S10 is shown in FIG. 6. In the example shown in FIG. 6, a screw for winding a spring of a wind-up robot (virtual object) is illustrated integrally with the robot as a rotating object.

At step S12 it is determined whether the stick 16 (or a finger of the player) is touching the touch panel 15 or not, based on the output signal from touch panel 15. When a contact is made, the process proceeds to step S14, and when a contact is not made, the process waits for a contact to be made.

At step S14, based on the output signal from the touch panel 15, the touch position coordinates 44 which indicate a touch position of the stick 16 on the touch panel 15 are detected, and stored in the RAM 24.

Figure 7A:
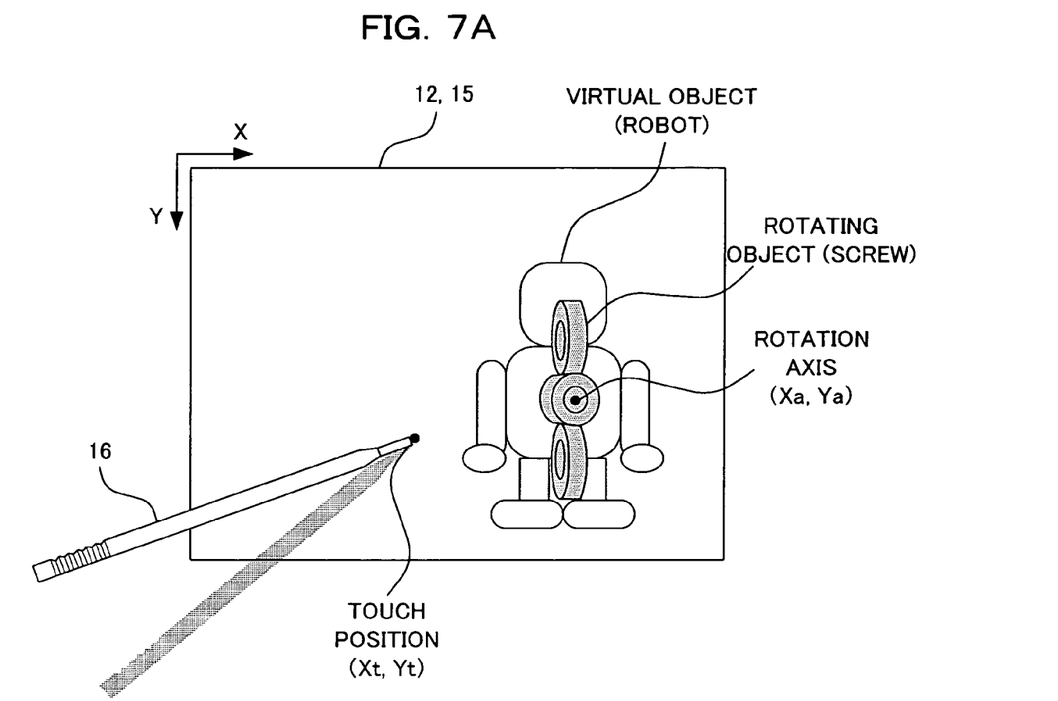
FIG. 7A is a diagram exemplifying a rotation axis and a touch position.
Figure 7B:
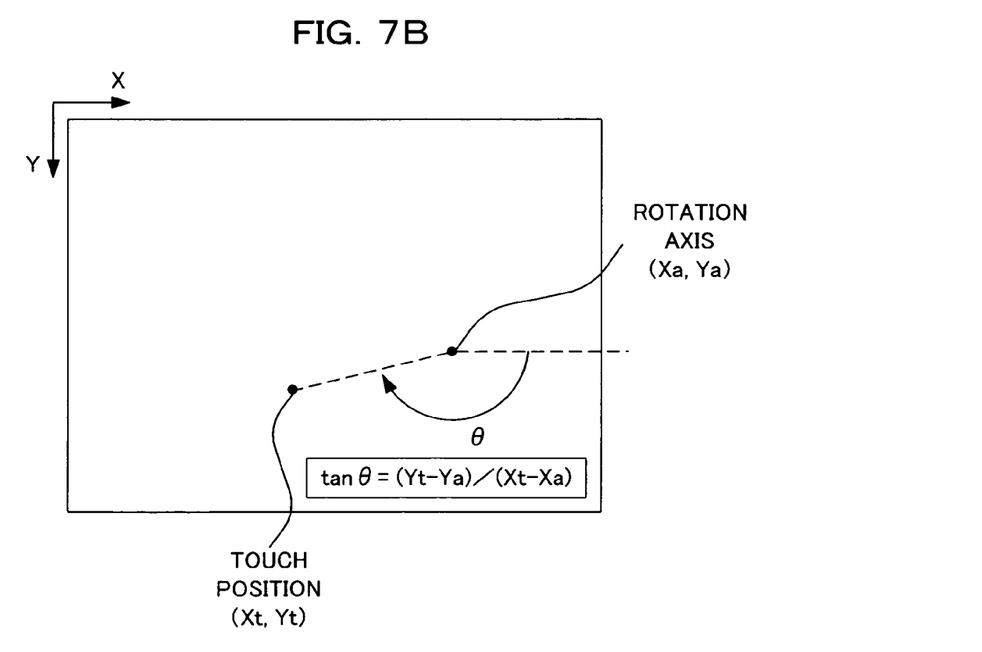
FIG. 7B is a diagram illustrating a calculation method of a relative angle.

At step S16, a relative angle of the touch position with respect to the rotation axis of the rotating object is calculated based on coordinates displaying the rotation axis of the rotating object (the rotation axis display coordinates 45) and the touch position coordinates 44. The rotation axis display coordinates 45 are obtainable from the position data of the rotating object. A calculation method of the relative angle at step S16 will be described by referring to FIGS. 7A and 7B. As shown in FIG. 7A, when the rotation axis display coordinates 45 are provided as (Xa, Ya), and the touch position coordinates 44 are provided as (Xt, Yt), a relative angle θ of the touch position to the rotation axis of the rotating object is calculated based on a relation of $\tan \theta = (Yt-Ya)/(Xt-Xa)$ as shown in FIG. 7B. The relative angle calculated at step S16 is stored in the RAM 24 as the current relative angle 46. In a case when the current relative angle 46 is already stored in the RAM 24, after the value is saved as the immediately preceding relative angle 47, the relative angle calculated at step S16 is stored as the current relative angle 46.

At step S18, the immediately preceding relative angle 47 is subtracted from the current relative angle 46, and the result is stored in the RAM 24 as the angle variation amount 48. Since the processes performed at steps S14 to S30 shown in FIG. 5 are repeatedly executed in one frame cycle (an update cycle of the game image) the angle variation amount 48 calculated at step S18 indicates a variation amount of a relative angle in one frame period.

Note that at step S18, a result of subtracting the immediately preceding relative angle 47 from the current relative angle 46 may be stored as the angle variation amount 48 only when the result is positive, and when the result is negative, the angle variation amount 48 is updated to 0. On the contrary, a result of subtracting the immediately preceding relative angle 47 from the current relative angle 46 may be stored as the angle variation amount 48, only when the result is negative, and when the result is positive, the angle variation amount 48 is updated to 0. Therefore, a rotating operation only in a predetermined direction (either clockwise or counterclockwise direction) is reflected in the operation parameter 50, precisely simulating a mechanism of a wind-up toy.

At step S20 a coefficient to be used in a subsequent step S22 is determined based on the operation parameter 50 and the coefficient table 49 (shown in FIG. 4) which are stored in the RAM 24. At the point of starting the game, since the operation parameter is set at 0, the coefficient is determined to be 1.0 from the coefficient table 49 shown in FIG. 4. As a result of repeatedly performing the processes of steps S14 to S30, if the operation parameter turns out to be 3000 for example, the coefficient is determined to be 0.5 at step S20. Also, if the operation parameter turns out to be 3500 for example, the coefficient is determined to be 0.2.

At step S22, the operation parameter 50 is updated based on the angle variation amount 48 calculated at step S18 and the coefficient determined at step S22. To be more specific, the operation parameter 50 is updated by adding a value resulting from a multiplication of the angle variation amount 48 and the coefficient to the operation parameter 50 stored in the RAM 24. That is, when the operation parameter 50 before being updated is shown as P-old and the operation parameter after being updated is shown as P-new, a relation will be shown as P-new=P-old+(angle variation amount×coefficient). An upper limit value is determined for the operation parameter 50, thus when a result of an addition exceeds the upper limit value, the operation parameter 50 is updated to the upper limit value.

At step S24, a display angle of the rotating object is determined in accordance with the operation parameter 50 updated at step S22, and stored in the RAM 24 as the rotating object display angle 51. Then at step S26, a game image is generated, in which the rotating object is inclined at an angle indicated by the rotating object display angle 51 in a clockwise direction from the initial state (FIG. 6) with the center set at the rotation axis. For example, when the operation parameter 50 is 45, the rotating object is displayed with an inclination of 45 degrees clockwise from the initial state, and when the operation parameter 50 is 1000, the rotating object is displayed with an inclination of 1000 degrees clockwise, i.e., the rotating object is displayed with and inclination of 280 degrees clockwise from the initial state.

At step S28, it is determined whether the operation parameter 50 has reached a maximum value or not. If the operation parameter 50 has not reached the maximum value yet, the process proceeds to step S30, and when the operation parameter 50 has reached the maximum value, the process proceeds to step S32.

At step S30, it is determined whether the stick 16 is removed from the touch panel 15 or not, based on the output signal from the touch panel 15. If the stick 16 is not removed from the touch panel 15 yet, the process returns to step S14, and when the stick 16 is already removed from the touch panel 15, a movement process is performed. Details of the movement process will be described later.

At step S32, in order to inform the player that the operation parameter 50 has already reached the maximum value, a special display effect is provided on the rotating object, and the game image is updated. Followings are examples of the special display effect: vibrating the rotating object; changing a color of the rotating object; changing a size of the rotating object; and changing a shape of the rotating object.

At step S34, it is determined whether the stick 16 is removed from the touch panel 15 or not based on the output signal from the touch panel 15. When the stick 16 is not removed yet, the process returns to step S32, and when the stick 16 is already removed, the process proceeds to step S36.

According to the above processes, the operation parameter 50 is gradually increased by the player's operation of sliding the stick 16 as to draw a circle around the rotation axis on the touch panel 15, and consequently the rotating object is rotated.

Figure 8A:
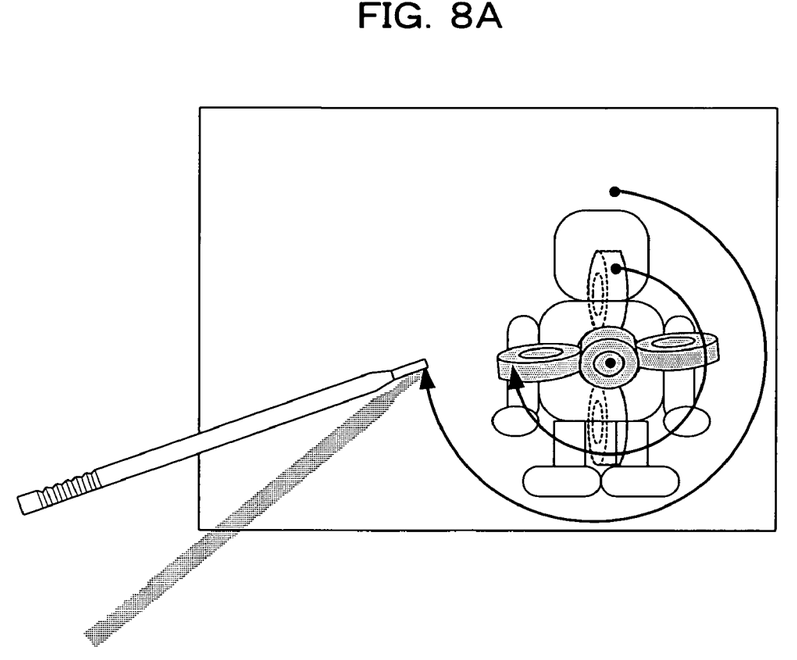
FIG. 8A is a diagram illustrating a movement of a rotating object during a rotating operation.

Specifically, during a period from the time a contact is made between the stick 16 and the touch panel 15 by the player, until the time the number of rotations of the stick 16 exceeds six rounds, the coefficient determined at step S20 is 1.0, thus the operation parameter 50 is increased by 360 at each rotation of the stick 16, and the rotating object is rotated once. Therefore, movements of both the stick 16 and the rotating object are completely synchronized as shown in FIG. 8A.

Figure 8B:
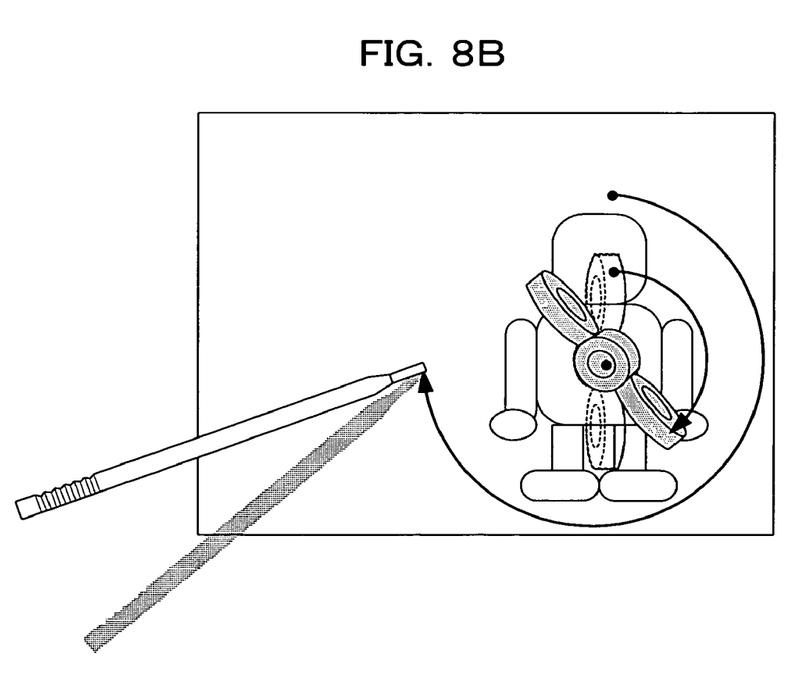
FIG. 8B is another diagram illustrating a movement of a rotating object during a rotating operation.

When the player continues the rotating operation, and the rotation of the stick 16 exceeds six rounds, the operation parameter 50 exceeds 2160, and the coefficient determined at step S20 is changed to 0.5. Then the operation parameter 50 is increased only by 360×0.5=180 at each rotation of the stick 16, i.e., the rotating object is rotated only by 180 degrees at a time. Thus, the movement of the rotating object slightly delayed from the movement of the stick 16 as shown in FIG. 8B.

Figure 8C:
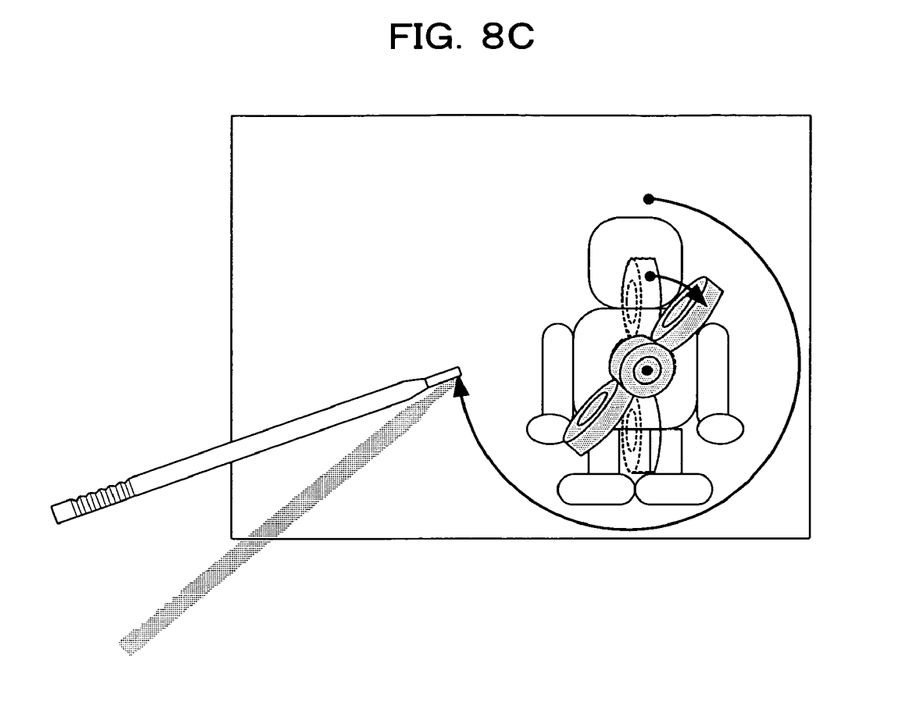
FIG. 8C is yet another diagram illustrating a movement of a rotating object during a rotating operation.

When the player continues the rotating operation, and the rotation of the stick 16 exceeds 12 rounds, the operation parameter 50 exceeds 3240 and the coefficient determined at step S20 is changed to 0.2. Then the operation parameter 50 is increased only by 360×0.2=72 at each rotation of the stick 16, i.e., the rotating object is rotated only by 72 degrees at a time. Thus, the movement of the rotating object is considerably delayed from the movement of the stick 16 as shown in FIG. 8C. Consequently, making the player feel that "the spring is becoming harder to wind as it is coming close to its winding limit". Actually, the increment of the operation parameter when the stick 16 is rotated once is also largely reduced from the time when the rotating operation is started.

Figure 8D:
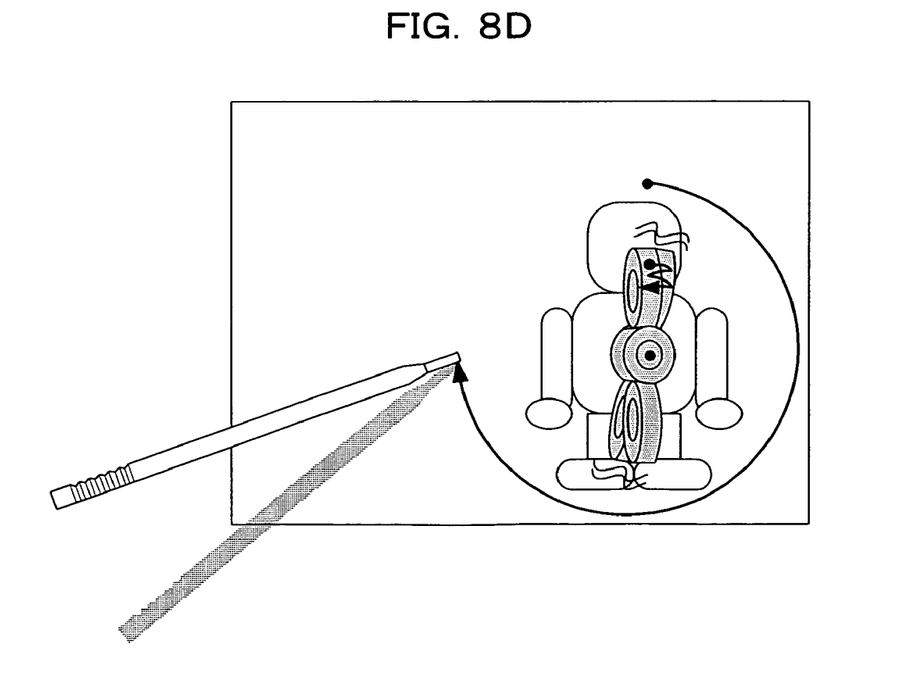
FIG. 8D is yet another diagram illustrating a movement of a rotating object during a rotating operation.

When the player further continues the rotating operation, the number of rotations of the stick 16 reaches 17, and the operation parameter 50 reaches the maximum value 3600. Then the rotating object vibrates as a special display effect (i.e., repeats a movement of making a small progress and returning to an original position). Consequently, the player is clearly informed that the operation parameter 50 has reached the maximum value.

As mentioned above, when the player rotates the stick 16 for a required number of rotations and then removes the stick 16 from the touch panel 15, a movement process of the virtual object (here a robot) is performed at step S36 of FIG. 5 based on the operation parameter 50 at the point. Details of the movement process will be provided below.

Figure 9:
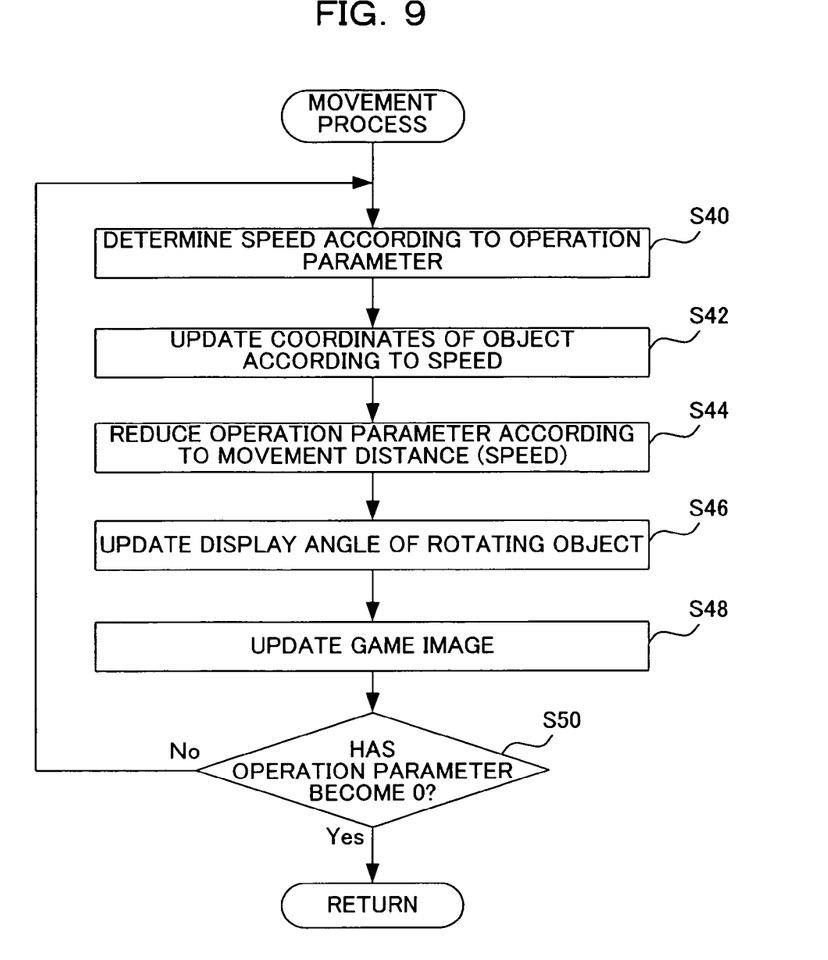
FIG. 9 is a flowchart illustrating details of a movement process.
Figure 10:
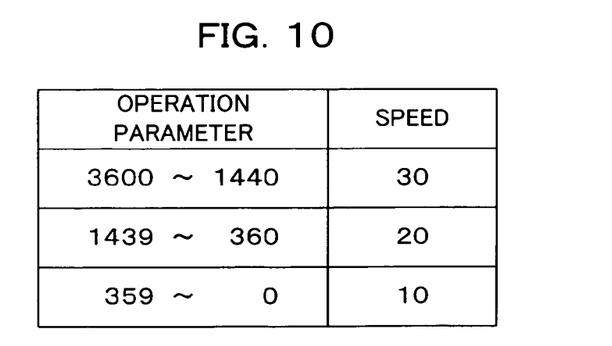
FIG. 10 is an example of a table to be used when determining a speed of a virtual object.

FIG. 9 is a flowchart illustrating details of the movement process. In FIG. 9, the CPU core 21 determines a speed of the virtual object at step S40 in accordance with the operation parameter 50. For example, the speed is determined by using a table such as shown in FIG. 10. In an example shown in FIG. 10, when the operation parameter 50 is 3000 for example, the speed is determined to be 30, and when the operation parameter 50 is 100, the speed is determined to be 10.

At step S42, position coordinates of the virtual object are updated based on the speed determined at step S40. For example, when the speed is 30, a position of the virtual object in the game space is shifted by a distance of 30 toward a predetermined direction of travel. Also, position coordinates of the rotating object provided integrally with the virtual object are updated.

At step S44, the operation parameter 50 is reduced by an amount in accordance with a distance of the movement (i.e., the speed determined at step S40) of the virtual object made at step S42. For example, when the virtual object is moved by a distance of 30 at step S42, the operation parameter 50 stored in the RAM 24 is reduced by 30.

At step S46, a display angle of the rotating object is determined in accordance with the operation parameter 50 which is updated at step S44, and stored in the RAM 24 as a rotating object display angle 51. This is a process same as that of step S24 in FIG. 5.

At step S48, the virtual object is displayed on the position coordinates of the virtual object updated at step S42. Also, a game image is generated, in which the rotating object provided integrally with the virtual object is inclined at an angle indicated by the rotating object display angle 51 in a clockwise direction from the initial state (FIG. 6) with the center set at the rotation axis. For example, when the operation parameter 50 is 45, the rotating object is displayed with an inclination of 45 degrees clockwise from the initial state, and when the operation parameter 50 is 1000, the rotating object is displayed with an inclination of 1000 degrees clockwise, i.e., the rotating object is displayed with and inclination of 280 degrees clockwise from the initial state.

At step S50, it is determined whether the operation parameter 50 has become 01 or not. When it is not 0 yet, the process returns to step S24, and the processes of steps S40 to S48 are repeated in one frame cycle until the operation parameter 50 becomes 0. When the operation parameter 50 becomes 0, the movement process is terminated.

Figure 11:
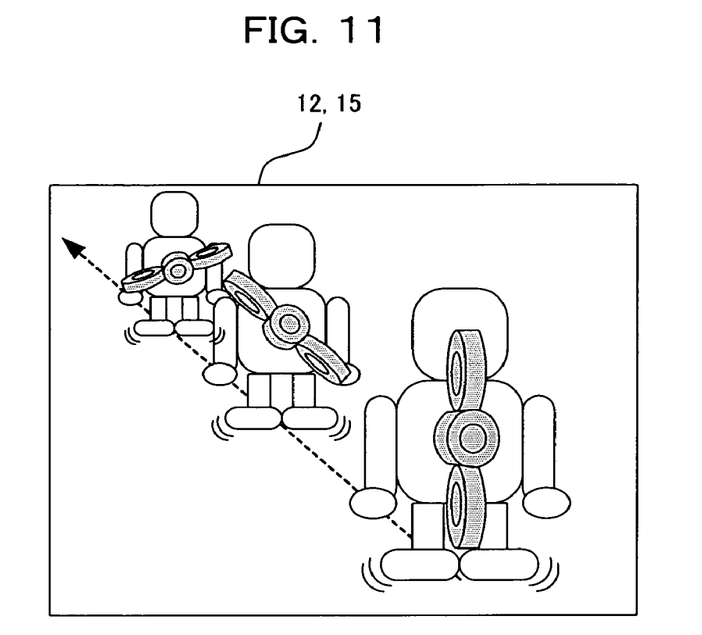
FIG. 11 is an example of a game screen during a movement process.

As a result of the above movement process, the robot which is a virtual object, advances toward a predetermined direction with the spring rotating in a counterclockwise direction as shown in FIG. 11, and eventually stops.

Specifically, while the operation parameter 50 is large, the virtual object moves rapidly, and the operation parameter 50 is reduced rapidly, thus the rotating object is rotated rapidly. On the other hand, when the operation parameter 50 becomes small, the virtual object moves slowly, and the operation parameter 50 is reduced slowly, thus the rotating object is rotated slowly. Consequently, a movement of the virtual object becomes similar to a movement of an actual wind-up robot.

Note that though in the present embodiment the operation parameter 50 is used to determine the movement speed of the virtual object, a use of the operation parameter 50 is not limited thereto. For example, the virtual object may be moved for a time period in proportion to a size of the operation parameter 50 of the time when the player finished the rotating operation (i.e., at the time the stick 16 is removed from the touch panel 15).

Figure 12:
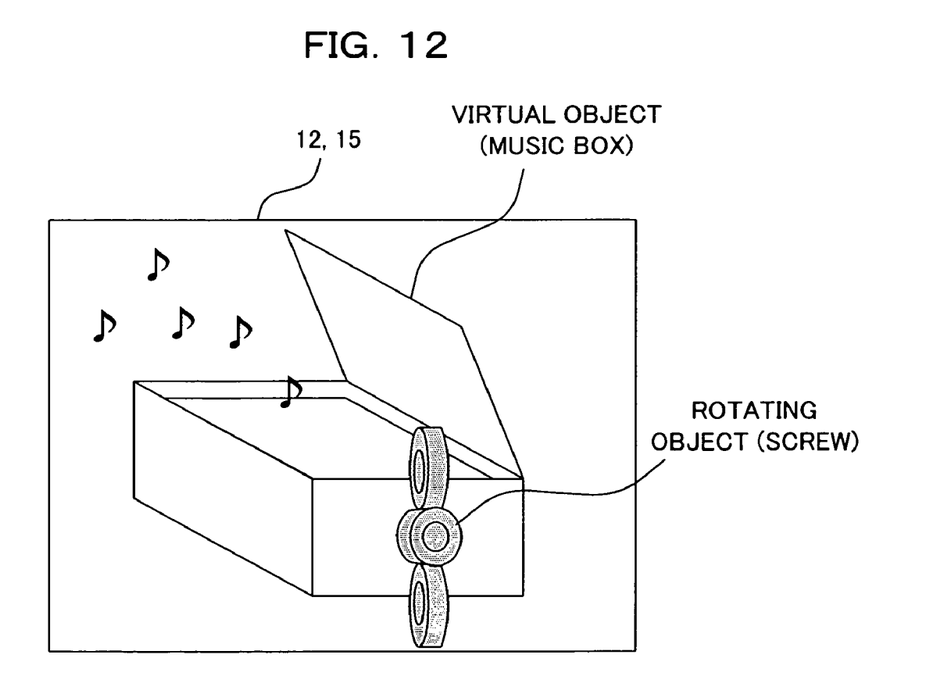
FIG. 12 is an example of a game screen according to another variant.

In addition, though an operation of a robot is exemplified in the present as an example of a virtual object, the present invention is not limited thereto. The present invention is also effective in a case when operating a music box, as illustrated in FIG. 12. Also in this case, the operation parameter 50 is increased by the player's operation of the stick 16 as same as the above example of using the robot, and a music is outputted from the loudspeakers 30a and 30b in accordance with a size of the operation parameter 50 of the time when the player finished the rotating operation (i.e., at the time the stick 16 is removed from the touch panel 15). As examples of a usage of the operation parameter 50 in this case, there are methods such as changing a duration of a musical performance in accordance with the operation parameter 50 or changing a speed of the musical performance in accordance with the operation parameter 50.

Also in the present embodiment, though the coefficient is determined by referring to the coefficient table 49 as shown in FIG. 3 it is not limited thereto. The coefficient may be determined for example, by performing a calculation of a predetermined function which takes the operation parameter 50 as an argument. In addition, the coefficient that is reduced in accordance with an increase of the operation parameter 50 in the present embodiment is not limited thereto. The coefficient may be increased in accordance with the increase of the operation parameter 50.

While the example embodiment has been described in detail, the foregoing description is in all aspects illustrative and not restrictive. It is understood that numerous other modifications and variations can be devised without departing from the scope of the example embodiment.

What is claimed is:

1. A computer readable storage medium having stored therein a game program to be executed by a computer of a game device having a display screen for displaying a game screen, a touch panel provided on the display screen, and a storage area, the game program causing the computer to execute:

reading from the storage area, image data of a rotating object having a predetermined rotation axis, and displaying the rotating object on the display screen;

obtaining touch position coordinates on the touch panel;

when a contact on the touch panel is performed, calculating at each interval of a given period, an angle variation amount between coordinates displaying the rotation axis of the rotating object and the touch position coordinates;

periodically adding to a predetermined parameter stored in the storage area for a game process, a value resulting from a multiplication of a coefficient with the angle variation amount, the coefficient which changes in accordance with a size of the parameter;

changing a display angle of the rotating object on the display screen in accordance with a change in the parameter; and using the parameter for the game process after the contact to the touch panel is released, wherein, when the parameter has reached a predetermined maximum value, the game program further causes the computer to execute providing a special display effect on the rotating object.

2. The computer readable storage medium according to claim 1, wherein the coefficient reduces as the parameter increases.

3. The computer readable storage medium according to claim 1, wherein the periodically adding is performed only when the angle variation amount is either positive or negative.

4. The computer readable storage medium according to claim 1, wherein the using the parameter moves, in the game space, a virtual object having the rotating object, with a speed in accordance with the parameter, and reduces the parameter in accordance with a movement amount of the virtual object.

5. The computer readable storage medium according to claim 1, wherein the using the parameter moves, in the game space, a virtual object having the rotating object for a time period in accordance with the parameter.

6. A game device comprising:

a display screen for displaying a game screen;

a touch panel provided on the display screen;

a storage area; and a processing section configured for reading from the storage area, image data of a rotating object having a predetermined rotation axis, and displaying the rotating object on the display screen;

obtaining touch position coordinates on the touch panel;

when a contact on the touch panel is performed, calculating at each interval of a given period, an angle variation amount between coordinates displaying the rotation axis of the rotating object and the touch position coordinates;

periodically adding to a predetermined parameter stored in the storage area for a game process, a value resulting from a multiplication of a coefficient with the angle variation amount, the coefficient which changes in accordance with a size of the parameter;

changing a display angle of the rotating object on the display screen in accordance with a change in the parameter; and using the parameter for the game process after the contact to the touch panel is released, wherein, when the parameter has reached a predetermined a maximum value, the processing section performs a special display effect on the rotating object.

7. The game device according to claim 6, wherein the coefficient reduces as the parameter increases.

8. The game device according to claim 6, wherein the processing section performs an adding process on the parameter only when the angle variation amount is either positive or negative.

* * * * *